May 26, 1942.  H. EDMONDS  2,283,979
VALVE ACTION
Filed Aug. 19, 1941  2 Sheets-Sheet 1

Inventor
HENRY EDMONDS,

By Clarence A. O'Brien
Attorney

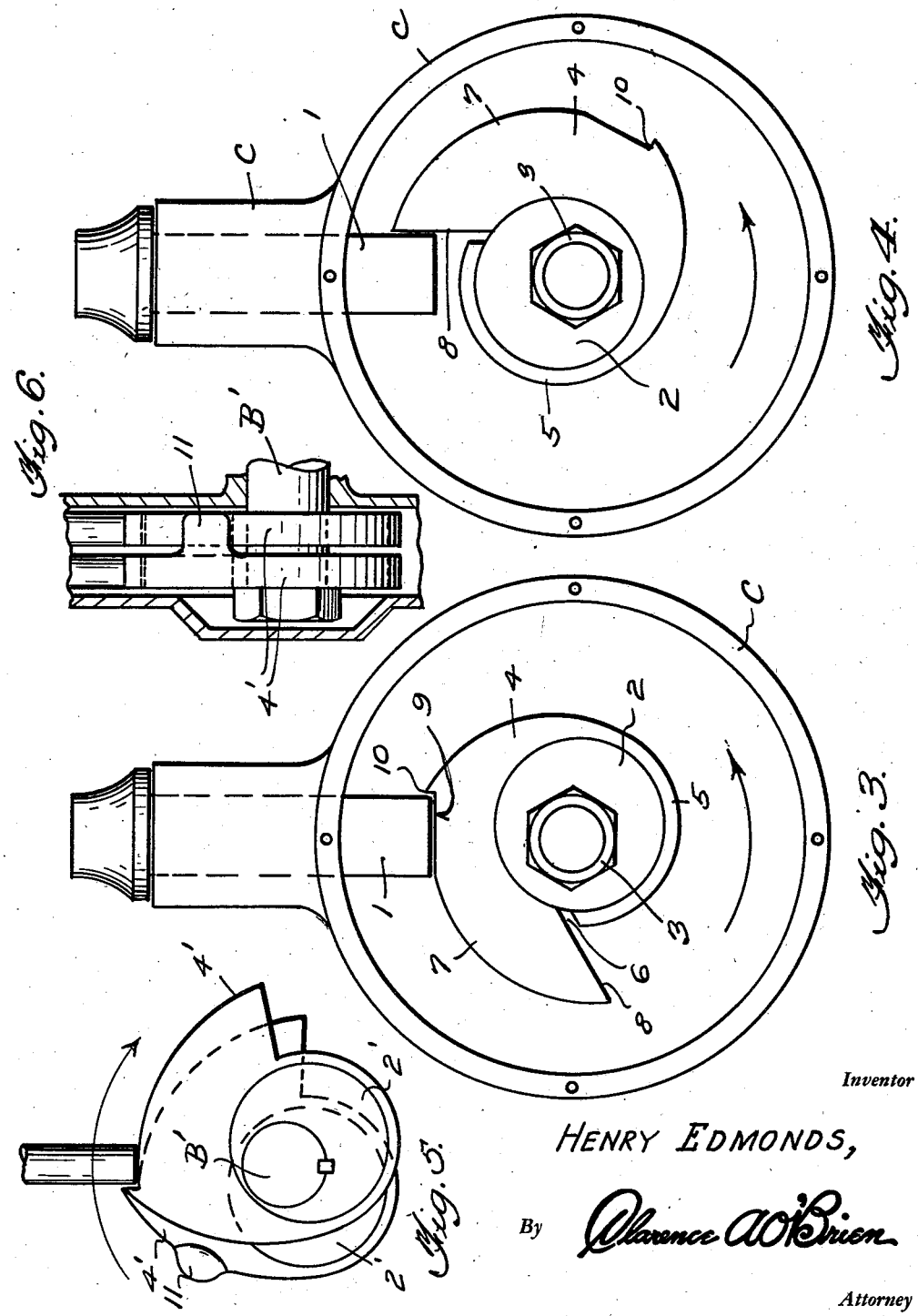

Patented May 26, 1942

2,283,979

UNITED STATES PATENT OFFICE 2,283,979

VALVE ACTION

Henry Edmonds, Leavenworth, Kans.

Application August 19, 1941, Serial No. 407,473

3 Claims. (Cl. 74—55)

This invention relates to a valve action for engines, the general object of the invention being to provide a cam on the crankshaft of the engine with the cam strap having two stop positions, one for the puropse of actuating the valve, and the other for stopping movement of the strap on the cam so as to prevent movement of the cam strap, thus enabling the valve mechanism to be operated once every two revolutions of the crankshaft. Thus this invention eliminates cam shafts and cam shaft gearings and danger of backfiring is lessened.

A further object of the invention is to so arrange and construct the parts that the invention can be used for operating both inlet and outlet valves.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 3 is a view similar to Figure 1 but with the closure cap removed and showing the parts of the invention in position for raising the tappet of the valve.

Figure 4 is a view similar to Figure 3 but showing the parts in position with the cam strap held against movement by the tappet while the cam and crankshaft are revolving.

Figure 5 is a view showing a pair of cams and their straps on the crankshaft for operating inlet and exhaust valves.

Figure 6 is a side view of the construction shown in Figure 5 with the case in section.

Figure 1:
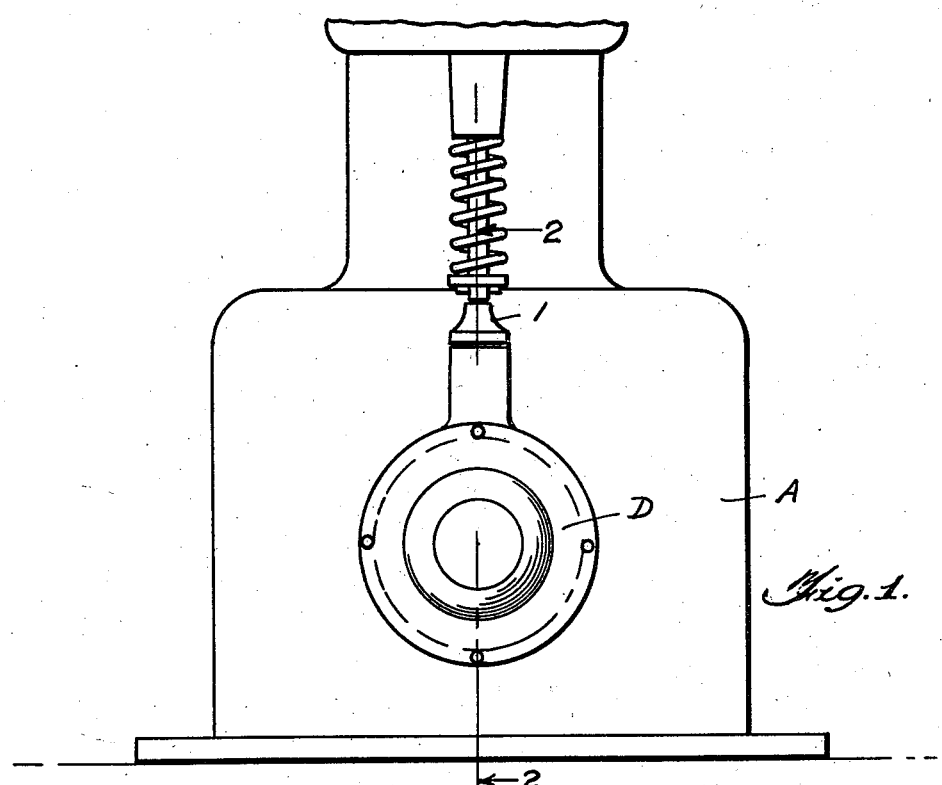
Figure 1 is an end view of a portion of an engine constructed in accordance with this invention.
Figure 2:
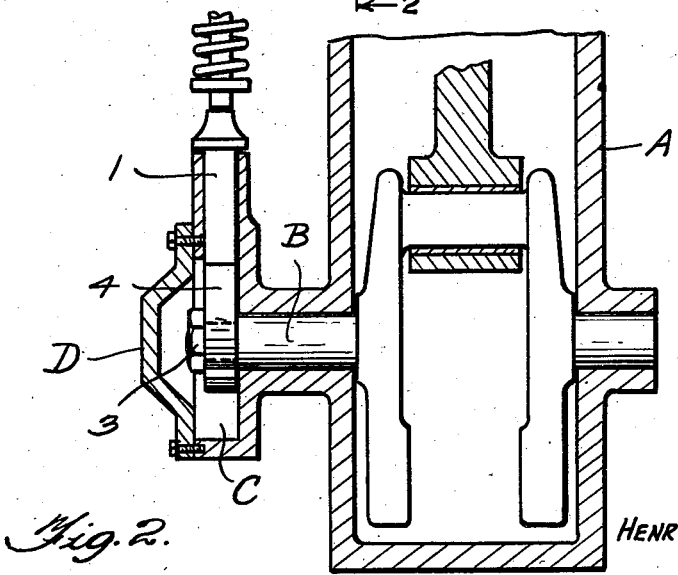
Figure 2 is a section on the line 2—2 of Figure 1.

In these views the letter A indicates a part of the crank case and the letter B indicates a portion of the crankshaft which extends into a cam housing C which is provided with a cover D. The valve operating tappet I depends into the upper part of the casing or housing C and in carrying out the invention I place a cam 2 on that end of the crankshaft which extends into the casing C, the cam being held in place in any suitable manner such as by means of the nut 3.

A cam strap 4 is frictionally held on the cam by means of a strap-like part 5 encircling the major portion of the cam with a slit 6 at the junction of this part 5 with the lowest part of the strap. The strap is provided with a large eccentric part 7, the end of which forms a shoulder 8 which is arranged to form part of the wall of the opening 6 and intermediate the ends of this part 6 is a flattened part 9 ending in a small shoulder 10.

The strap 4 will rotate with the cam until the shoulder 8 or the shoulder 10 engages a part of the tappet I when movement of the strap on the cam is prevented. Thus in Figure 3 when the shoulder 10 engages the tappet further movement of the strap is prevented so that the cam rotates in the strap and causes upward movement of the strap so that the tappet is raised. Upon further movement of the cam in the strap the strap is lowered so that the shoulder 10 will clear the lower end of the tappet and then the strap will rotate with the cam until the shoulder 8 engages the tappet, as shown in Figure 4, and then further movement of the strap is prevented until the crankshaft and the cam complete one revolution when the strap will be lowered to cause the shoulder 8 to clear the tappet and then the parts returned in the position shown in Figure 3. Thus the strap will only operate the tappet once in every two revolutions of the crankshaft.

The difference in length of opening and closing time of the inlet and exhaust valves can be obtained by changing the throw of the cams and length of straps and position stops.

In the arrangement shown in Figures 5 and 6 a pair of cams 2' are provided on the crankshaft B' and each cam has a cam strap 4' encircling the same and frictionally engaging the same. These straps are made substantially like those just described and one strap will operate the inlet tappet and valve and the other the outlet valve and one strap has a lateral projection 11 thereon for engaging a stop of the strap so that there is no danger of the parts getting out of time as might happen if the engine "kicked" backwardly for any reason.

This double arrangement shown in Figures 5 and 6 can be used for an intake valve by increasing the width of the tappet of the valve so that both cam straps will engage the same and this arrangement permits the engine to be run either clockwise or anti-clockwise and still remain in valve time. That is, having the intake valve open on top dead-center in either direction of rotation of the engine.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A mechanical movement comprising a rotary shaft and a member to be lifted by the shaft, a cam on the shaft, a cam strap encircling the cam and moving therewith under the action of friction, said strap having a part for lifting the member when the strap is moved upwardly by the cam and a stop on the strap for engaging the member for holding the strap against movement while the shaft is making one revolution.

2. A mechanical movement comprising a rotary shaft and a reciprocating member, a cam on the shaft, a strap frictionally engaging the cam and having a pair of shoulders thereon for engaging an end of the member, one shoulder holding the strap against movement to cause movement of the cam to raise the strap to raise the member and the other shoulder engaging the member for holding the strap against movement while the cam and shaft are making one revolution.

3. A mechanical movement comprising a rotary shaft and a pair of members to be lifted by the shaft, a pair of cams on the shaft, a pair of straps frictionally engaging the cams and having parts engaging the members, stops on the straps for causing the straps to raise the members once every two revolutions of the crankshaft, and a projection on one strap for engaging a stop on the other strap for keeping the parts in time.

HENRY EDMONDS.